June 18, 1968     G. R. PLAMPER ET AL     3,388,759
SELF-PROPELLED MOWER

Filed Feb. 10, 1966     2 Sheets-Sheet 1

INVENTORS
GERHARD R. PLAMPER
GÜNTER F. PLAMPER
BY
ATTORNEYS

INVENTORS
GERHARD R. PLAMPER
BY GÜNTER F. PLAMPER

ATTORNEY

United States Patent Office 3,388,759
Patented June 18, 1968

3,388,759
SELF-PROPELLED MOWER
Gerhard R. Plamper and Günter F. Plamper, Cleveland, Ohio, assignors to The M. T. & D. Company, a corporation of Ohio
Filed Feb. 10, 1966, Ser. No. 526,417
6 Claims. (Cl. 180—19)

ABSTRACT OF THE DISCLOSURE

A self-propelled mower having a power-take-off pulley, a driven pulley operatively connected to a wheel of the mower for driving the mower, a belt reeved around the pulleys, an extension member extending at an angle from the lower end of the mower handle pivoted to the mower so as to be raised when the handle is lowered and lowered when the handle is raised, a belt tensioning device pivotally carried by the mower in the general plane of, and on one side of, the belt for loosening and tightening the same, the tensioning device having an opening in which is located an abutting member carried by the end of the extension member, the opening having diverging sides alternately abuttable by the abutting member to move the tensioning member in opposite directions, the diverging sides being joined by an arcuate side disposed in a curve generated at the apex of the diverging sides, the arcuate side confining the abutting member within the opening and permitting it to swing in an arc in its movement between the diverging sides.

---

Our invention relates to power-operated lawn mowers adapted to be propelled by the power derived from the motor thereof.

An object of our invention is to provide improved means for connecting and disconnecting drive wheels of a lawn mower or the like from the power produced by the motor of the lawn mower.

Another object is to provide an improved belt drive transmitting power from the motor of a mower to the wheels of a mower, and for controlling the tensioning of the belt drive.

Another object is the provision of an arrangement for tensioning and untensioning a belt drive by manipulation of the handle of the mower.

Another object is the provision for so controlling the delivery of power from the motor of a mower to the driving wheels of a mower that the driving wheels are driven upon the raising of the mower handle and are not driven upon the lowering of the mower handle.

Another object is the provision of a unique arrangement in a power mower by which to readily manipulate the mower and cause the same to be propelled forwardly as desired and to be freewheeling or not powered as desired.

Other objects and a fuller understanding of the invention may be had by referring to the following description and claims, taken in conjunction with the accompanying drawings, in which:

Figure 2:
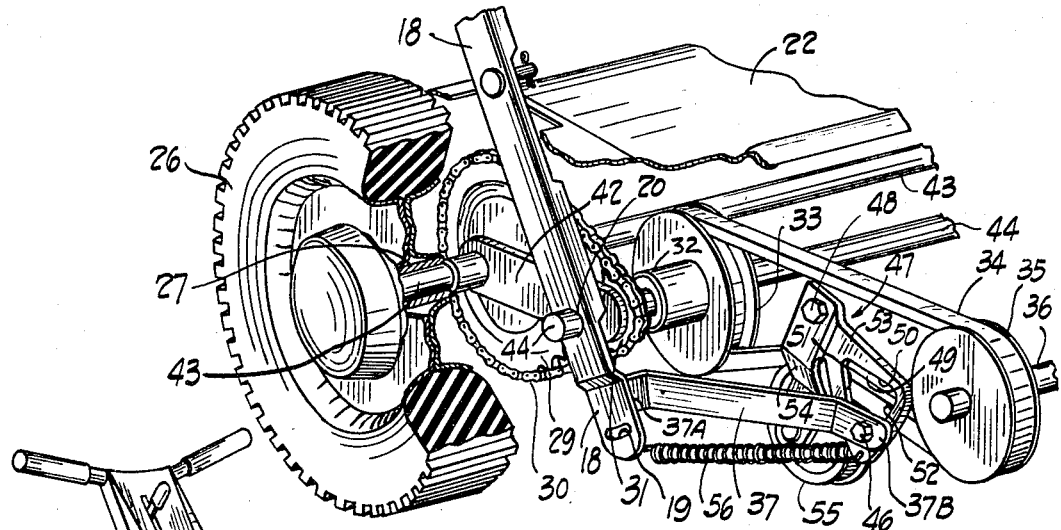
FIGURE 2 is an enlarged cut-away view of a portion of the same mower illustrating the arrangement for the driving of the wheels thereof by the power of the motor.
Figure 5:
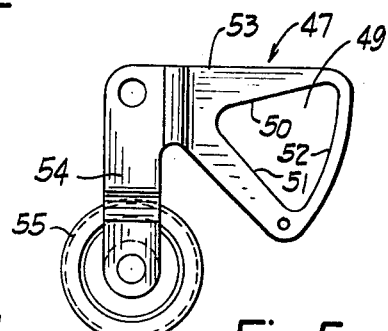
FIGURE 5 is an enlarged view of the tensioning member utilized in our invention.
Figure 1:
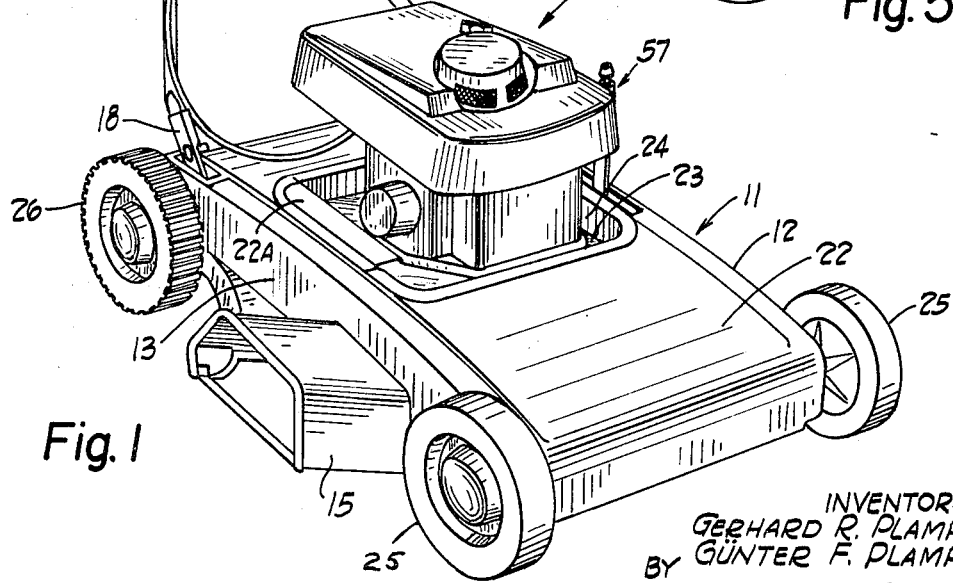
FIGURE 1 is a perspective view of a lawn mower embodying a preferred form of our invention.
Figure 3:
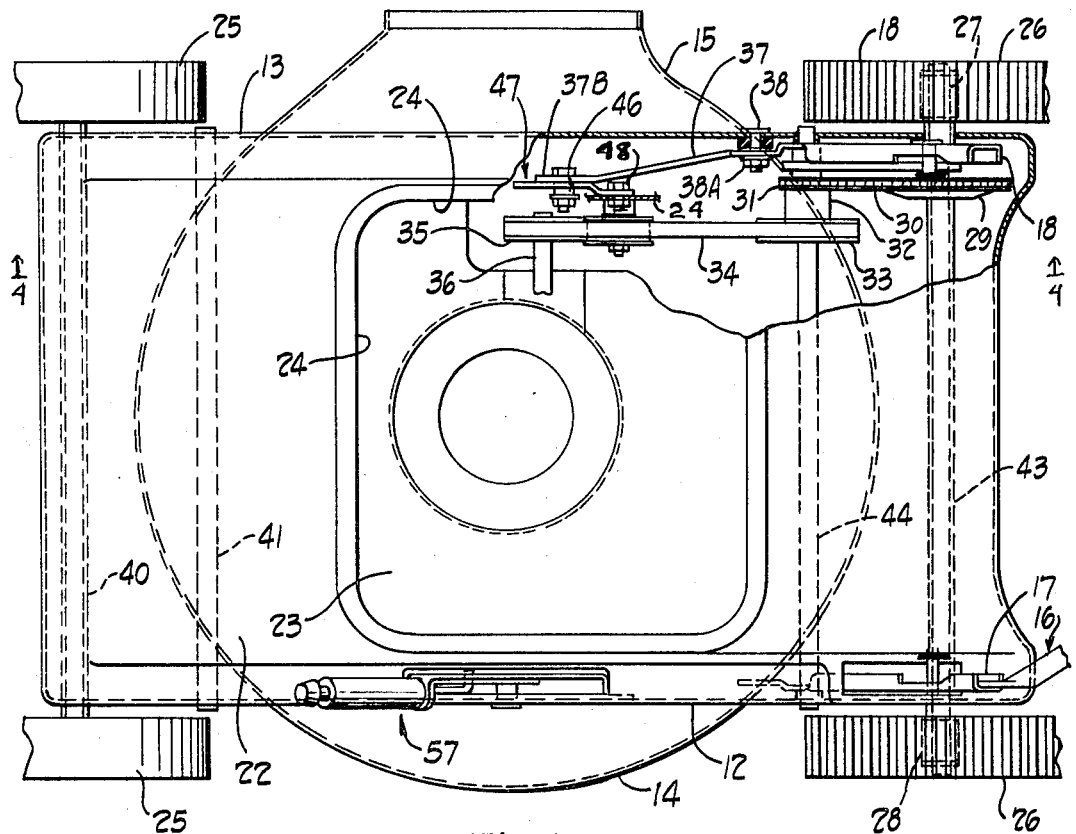
FIGURE 3 is a plan view of the mower embodying the preferred form of our invention with the motor removed from the top of the housing for convenience in illustrating the invention.
Figure 4:
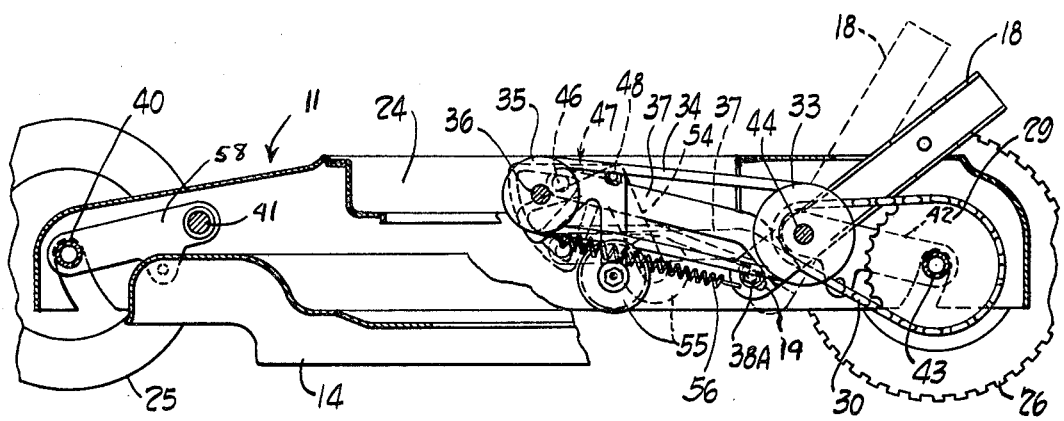
FIGURE 4 is a longitudinal sectional view taken through the line 4—4 of FIGURE 3, and again showing the mower with the motor removed for convenience of illustration.

The lawn mower shown in the drawings embodying our invention has a housing denoted generally by the reference character 11. This housing 11 has two parallel side walls 12 and 13 extending down along the sides of the housing. The sides 12 and 13 are joined by a deck portion 22. This deck portion 22 has a centrally located lower flat portion 23 accommodating the lower portion of the motor or engine denoted generally by the reference character 21. This central portion 23 has a side wall 24 extending therearound. There is a removable panel portion 22A so secured to the deck 22 that it may be readily removed to provide access to the internal parts below. Disposed below and secured to the housing 11 is a hood 14 which accommodates a cutting blade of the mower, which blade revolves in a horizontal plane. The blade is revolved by a vertically disposed shaft extending downwardly from and driven by the motor 21. This blade and shaft are of the usual type for rotary mowers and are not shown for purposes of convenience in illustration. Extending outwardly from one side of the hood 14 is a discharge chute 15.

A handle member denoted generally by the reference character 16 extends upwardly and rearwardly from the mower housing 11 in the usual manner. The two lower spaced ends of the handle member 16 are detachably secured to two spaced extension members 17 and 18 carried by the housing 11 adjacent the rearward end thereof.

Carried on a forward axle 40 are a pair of forward wheels 25 and carried on a rearward axle 43 are a pair of rear wheels 26. The elevation of these wheels 25 and 26 relative to the housing 11 may be adjustably varied by a mechanism shown and described in greater detail in our concurrently filed co-pending application entitled "Mower Having Wheel Adjustable Means." In short, the front wheels 25 on axle 40 may be swung upwardly and downwardly on arms 58 about the axis of the shaft 41 and the rear wheels 26 on the axle 43 may be swung upwardly and downwardly on arms 42 about the axis of the shaft 44.

Extending laterally out from the motor 21 is a power take-off shaft 36 which is rotated by the power of the motor 21. Keyed to this shaft 36 is a pulley 35 which rotates therewith. A pulley 33 is mounted upon shaft 44, which pulley 33 has a hub portion 32 rotatable therewith. This hub portion 32 has a sprocket wheel 31 keyed thereto so that the sprocket wheel 31 rotates with the pulley 33. An endless flexible belt 34, such as a rubber belt of generally V cross-section, is reeved around the pulleys 35 and 33 whereby rotation of the pulley 35 may rotate the pulley 33 upon tensioning of the driving belt 34. A sprocket wheel 29 is carried by and keyed to the axle 43 so as to rotate the axle 43 upon rotation of the sprocket wheel 29. The diameter of the sprocket wheel 29 is relatively larger than the diameter of the sprocket wheel 31. An endless driving chain 30, sometimes called a bicycle chain, is disposed around and in engagement with the sprocket wheels 31 and 29 whereby rotation of one causes simultaneous rotation of the other, the ratio thereof being in accordance with the difference in sizes of the sprocket wheels 31 and 29.

Mounted within the hub of each of the rear wheels 26 is a one-way clutch, clutch 27 being mounted in the driving wheel on one side and clutch 28 being mounted in the driving wheel on the other side. These clutches 27 and 28 are of opposite phase in that each is arranged to drive its respective wheel forwardly upon rotation of the shaft 43 in an appropriate rotation for forward movement. In other words, the clutches 27 and 28 may not be substituted one for the other as each is designed to drive the wheel in which it is mounted forwardly upon rotation of the shaft 43 in one direction but to permit slippage or non-rotation of the wheel in an opposite direction. Such one-way clutches are commonly known. One commercially available clutch is made by the Torrington Bearing Company and has roller bearings which wedge to drive the wheels forwardly when the axle is rotated in one direction but which become non-wedging and provide a non-driving connection between the axle and wheels when the axle is rotated in an opposite direction. There are other one-way clutches which provide a similar function by means of a pivoted pawl which engages in the teeth of a gear when there is relative rotation in one direction but which slip and do not engage when there is relative rotation in an opposite direction.

The handle extension members 17 and 18 connected to the lower ends of the handle member 16 are pivotally carried by the outer free ends of the shaft 44 whereby the extension members 17 and 18 may swing in parallel vertical planes at the opposite ends of the shaft 44 between limits. To provide limits for the swinging movement of the handle member 16 there is provided in a lower end of extension member 18 an arcuate slot 19. A pin 38 carried by the side 13 of the housing and extending inwardly of the housing slidably fits in the arcuate slot 19. The length of the slot 19 relative to the pin 38 is such as to permit a limited amount of swinging of the handle member 16 about the axis of the shaft 44.

Welded to and angularly extending from the lower portion of the extension member 18 is an arm 37 better shown in detail in FIGURE 2. The forward end of the arm 37 carries a pin or abutting portion 46. The arm 37 is angularly bent as shown in order to position the pin or abutting member 46 in the general plane of the pulleys 35 and 33.

A tensioning member indicated generally by the reference character 47 is pivotally carried on a pivot pin 48 which, in turn, is carried by the side wall 24 of the well or central portion 23 of deck 22. This tensioning member 47 has an arm 53 extending therefrom and another arm 54 extending at substantially right angles thereto whereby the tensioning member 47 is in the form of a bell crank swingable about the axis of the pivot pin 48. Formed in the arm 53 is a triangular-shaped opening 49. The upper edge of this opening 49 is denoted by the reference character 50 and another or lower edge disposed at an angle thereto is denoted by the reference character 51. These upper and lower edges 50 and 51, respectively, are joined by a third arcuately shaped edge 52. Journaled upon the lower end of the arm 54 is a roller 55 so shaped as to engage the lower surface of the belt 34. Upon the roller 55 being moved upwardly, the belt 34 is tensioned to provide driving connection between pulley 35 and pulley 33. Upon the roller 55 being moved downwardly on the tensioning member 47, the belt 34 is loosened and untensioned and driving connection between pulleys 35 and 33 is discontinued or terminated.

The pin or abutting member 46 carried on the end of arm 37 is disposed within the triangular opening 49. Upon the pin 46 engaging the upper edge 50 and being forced upwardly thereagainst, the tensioning member 47 is swung on the pivot of pin 48 and this moves the roller 55 downwardly away from the belt 34. Upon the pin 46 being swung downwardly and forced against the edge 51, then the tensioning member 47 is swung on the pivot of pin 48 so as to move the roller 55 upwardly and against the lower portion of belt 34 so as to tension or tighten the belt 34 and thus provide driving connection between pulleys 35 and 33. Interconnecting the lower end of arm 35 of tensioning member 47 and the lower end of the extension member 18 is a coil spring 56 which resiliently urges the tensioning member 47 in a direction so as to raise the roller 55 upwardly against the lower portion of belt 34. This resilient bias, however, is overcome by the pin 46 moving upwardly against the edge 50 so as to swing the tensioning member 47 in the opposite direction thus loosening or untensioning the belt. The pin 46 tends to ride or move along the arcuate edge 52 in moving between its extreme positions in the triangular opening 49. Also as the pin 46 is pressed upwardly against the upper edge 50, the pin tends to cammingly engage the edge 50 and progressively raise the tensioning member upwardly. Similarly, in moving downwardly against the lower edge 51, the pin 46 tends to cammingly engage the lower edge 51 and to move the same downwardly so as to swing the roller 55 up into tensioning position. By reason of the arrangement of the edges of the opening 49 and the fit of the pin 46 therein, there need not be an exact interfit of a pin within a slot as the structure and arrangement shown permits for variations in dimensions and interfit of the parts.

The arrangement for raising and lowering the forward and rearward wheels 25 and 26, respectively, is denoted generally by the reference character 57. Swinging of the lever of the mechanism 57 changes the elevation of the housing relative to the ground surface upon which the wheels are based.

It is thus seen that by moving the upper end of the handle 16 upwardly and forwardly, the belt 34 is tensioned so that the power of the motor causes the rear axle 43 to rotate. By reason of there being a different one-way clutch in each hub of the rear wheels 26, a differential action is provided whereby the mower may be turned or steered in a curve as long as the handle member 16 is held upwardly or forwardly and the power from the motor 21 is continued to be delivered to the rear axle and hence through the one-way clutches to the rear wheels 26 to propel the mower forwardly. However, upon lowering the upper end of the handle member 16, the tensioning member 47 is loosened and the belt 34 no longer delivers power to the rear wheels through the driving connections described. As the belt 34 is free to slide, the pulley 33 may rotate with the sprocket wheels 31 and 29 and there is no drag upon the rear wheels 26 from any connection with the motor 21. This in effect gives free wheeling to the rear wheels 26 so that the mower may be manually moved rearwardly and forwardly without any drag from a connection with the motor 21. Again, when it is desired to propel the mower forwardly, the upper end of the handle is raised and this causes the tensioning member 47 to be swung in a direction for tensioning the belt 34 and then the mower is propelled forwardly from the power derived from the motor 21. The arrangement provides for a differential action in turning corners and also provides for free wheeling when the rear wheels are not operatively connected with the motor. Ease and flexibility are provided by the arrangement shown and as seen a separate control mechanism for operating a clutch mechanism is not necessary.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. Mechanism for selectively driving the rear wheels of a power mower or the like having a motor mounted thereon, the motor having a power-take-off pulley driven thereby, said rear wheels being mounted on a rear axle to be driven forward upon rotation of said rear axle in a forward direction, the mower or the like having a handle member pivotaly carried thereby and extending therefrom for steering of the mower or the like and being pivotally swingable on a first pivot axis alternately to upper and lower operating positions, comprising the combination of a shaft journaled on said mower or the like and having its axis disposed parallel to the axis of said power-take-off pulley, power transmitting means operatively interconnecting said shaft and said rear axle for rotating said axle, a second pulley mounted on said shaft to rotate the same, a belt reeved about said power-take-off pulley and said second pulley to transmit power from the power-take-off pulley and said second pulley upon tensioning of the said belt, a tensioning device pivotally carried on a second pivot axis by said mower or the like adjacent said belt to swing about an axis parallel to the axes of said pulleys, said tensioning device having a roller positioned to engage said belt and to tension the same upon being moved in a tensioning direction relative to the belt and to loosen the belt upon being moved in a loosening direction relative to the belt, said tensioning device having first and second spaced engaging surfaces at a radial distance from (the axis thereof), said second pivot axis, an abutting member swingable about said first pivot axis adapted to alternately engage and press upon said spaced engaging surfaces upon the abutting member being swung in alternate directions to thereby pivotally swing said tensioning device alternately in said tensioning direction and in said loosening direction, said first and second engaging surfaces being disposed along lines diverging from each other as they extend away from said second pivot axis, said tensioning device having an arcuate surface in the plane of, and joining, said engaging surfaces and along which the abutting member may ride in an arc as it swings about said pivot axis between said first and second engaging surfaces to retain the abutting member in said arcuate path to alternately engage said first and second surfaces at the terminii of the arcuate path and a connecting member interconnecting said abutting member and said handle member to be moved in accordance with the swinging of the handle between its said upper and lower operating positions, the swinging of said handle moving said tensioning member through said connecting member and abutting member in tensioning and loosening directions in accordance with the direction of the alternate swinging of the handle.

2. Mechanism as claimed in claim 1 and in which said tensioning device is a bell crank having an arm carrying said roller and an arm carrying said spaced engaging surfaces, said surfaces being disposed to face each other and the said abutting member being disposed intermediate the said engaging surfaces.

3. Mechanism as claimed in claim 2 and in which said abutting surfaces are defined by opposite edges of an opening in said tensioning member, said opposite edges being disposed at an acute angle to each other and being joined by an arcuate edge accommodating the movement of the abutting member swinging in an arc upon the swinging of said connecting member and said handle member.

4. Mechanism as claimed in claim 1 and including resilient means associated with said abutting member for resiliently biasing the same to press against the abutting surface of said spaced abutting surfaces positioned to urge the tensioning device in a tensioning direction, said resilient means being operatively connected with said tensioning device to be tensioned by the swinging of said handle member to upper operating position.

5. Mechanism as claimed in claim 1 and in which said belt is formed in an elongated loop about said pulleys, said roller of the tensioning device is positioned outside said loop on one long side thereof and upon the tensioning member being moved in tensioning direction the belt on said one long side of the belt is moved by the roller toward the other long side of the belt.

6. In a power mower or the like having wheels adapted to be driven by the motor of the mower or the like, power-transmitting means carried by the mower or the like for transmitting power from said motor to the said wheels, said power-transmitting means including a belt reeved about pulleys having generally parallel axes, the belt upon being tensioned transmitting power through the belt from one pulley to the other and upon being loosened discontinuing the transmission of power therethrough from one pulley to the other, said mower or the like having a handle member extending therefrom and swingable in an upright plane between upper and lower positions, the combination of a belt-tensioner pivotally carried by said mower or the like adjacent said belt, said belt-tensioner having a roller positioned to engage a side of said belt at a location remote from said pulleys to tension the same upon the belt-tension being pivotally swung in a tensioning direction and to untension the belt upon being pivotally swung in an opposite direction, an arm member carried by and extending from said handle member to be pivotally swung upon the pivotal swinging of said handle member between said positions, linkage means operatively connecting said arm member and said belt-tensioner to cause the belt-tensioner to move in a tensioning direction upon the handle member being swung toward said upper position and to cause the belt-tensioner to move in an opposite direction upon the handle member being swung toward said lower position, said linkage means including a camming member connected to the belt tensioner and having two diverging opposed spaced surfaces joined by an arcuate surface, said spaced surfaces and arcuate surface defining a three-sided opening, and a pin member connected to the said arm member and swingable therewith in an arc within said arcuate surface alternately against each of said opposed surfaces to move the belt-tensioner in an opposite direction upon being swung against the other of said surfaces, said surfaces being sufficiently spaced to permit a lag between the movements against the opposite surfaces, and including resilient means associated with said linkage means for resiliently urging the pin member against the spaced surface disposed for moving the belt-tensioner in a tensioning direction.

References Cited

UNITED STATES PATENTS

| | | | |
|---|---|---|---|
| 1,422,809 | 7/1922 | Anderson | 74—242.1 |
| 2,448,074 | 8/1948 | Bishop. | |
| 2,453,999 | 11/1948 | Melling | 180—19 |
| 2,468,839 | 5/1949 | Rodesci | 180—19 X |
| 2,601,698 | 7/1952 | Humphrey. | |
| 2,941,610 | 6/1960 | Clemson | 180—19 |

BENJAMIN HERSH, *Primary Examiner.*

J. A. PEKAR, *Assistant Examiner.*